(12) United States Patent
Doi

(10) Patent No.: US 8,159,450 B2
(45) Date of Patent: Apr. 17, 2012

(54) LIQUID CRYSTAL DISPLAY AND DISPLAY CONTROL METHOD FOR THE SAME

(75) Inventor: Hiroshi Doi, Kanagawa (JP)

(73) Assignee: Sony Corporation (JP)

( * ) Notice: Subject to any disclaimer, the term of this patent is extended or adjusted under 35 U.S.C. 154(b) by 875 days.

(21) Appl. No.: 12/080,625

(22) Filed: Apr. 4, 2008

(65) Prior Publication Data

US 2008/0252590 A1    Oct. 16, 2008

(30) Foreign Application Priority Data

Apr. 11, 2007   (JP) ................ P2007-104018

(51) Int. Cl.
 *G09G 3/36*    (2006.01)
(52) U.S. Cl. ...... 345/102; 362/97.1; 362/97.2; 362/97.3
(58) Field of Classification Search .............. 345/102; 362/97.1–97.3
 See application file for complete search history.

(56) References Cited

U.S. PATENT DOCUMENTS

| | | | | |
|---|---|---|---|---|
| 2005/0110742 | A1* | 5/2005 | Arakawa | 345/102 |
| 2006/0038511 | A1* | 2/2006 | Tagawa | 315/291 |
| 2007/0024772 | A1* | 2/2007 | Childers et al. | 349/68 |
| 2007/0296684 | A1* | 12/2007 | Thomas et al. | 345/102 |
| 2009/0279872 | A1* | 11/2009 | Umemoto et al. | 386/124 |

FOREIGN PATENT DOCUMENTS

| | | | |
|---|---|---|---|
| JP | 2001-142409 A | 5/2001 | |
| JP | 2006-330222 A | 12/2006 | |

* cited by examiner

*Primary Examiner* — Alexander Eisen
*Assistant Examiner* — Sanjiv D Patel
(74) *Attorney, Agent, or Firm* — Lerner, David, Littenberg, Krumholz & Mentlik, LLP

(57) ABSTRACT

In the case where a screen divided display is performed on a liquid crystal panel, a change in brightness or chromaticity between sub regions divided may be reduced. A display includes: a display panel; a backlight arranged corresponding to each of sub regions, and selectively illuminating the corresponding sub region, the sub regions being defined by dividing a display region of the display panel into a plurality of parts; a monitoring means for monitoring the light emission state of the backlight corresponding to each of the sub regions; and a display control means for determining a sub region on which an image is to be displayed, on the basis of the monitoring result of the monitoring means, to fit the image into the determined sub region, and controlling a backlight corresponding to the determined sub region to emit light.

23 Claims, 5 Drawing Sheets

LIQUID CRYSTAL DISPLAY AND DISPLAY CONTROL METHOD FOR THE SAME

CROSS-REFERENCE TO RELATED APPLICATIONS

The present application claims priority from Japanese Patent Application No. JP 2007-104018 filed in the Japanese Patent Office on Apr. 11, 2007, the entire content of which is incorporated herein by reference.

BACKGROUND OF THE INVENTION

1. Field of the Invention

The present invention relates to a liquid crystal display displaying an image on a liquid crystal panel through the use of a backlight, and a display control method for the liquid crystal display.

2. Description of the Related Art

Large-screen liquid crystal televisions has steadily become popular at home according to advances in liquid crystal panel technology and cost reduction. In particular, in the case of watching a program such as a movie program or a sports program, a higher level of realism may be obtained with such a large-screen liquid crystal television. On the other hand, there is an issue that such a large-screen television consumes a large amount of power. Typically, the liquid crystal television uses a backlight for illuminating a liquid crystal panel, so when the size of the liquid crystal panel is increased, the power consumption of the backlight is increased accordingly.

To overcome the issue, for example, Japanese Unexamined Patent Application Publication No. 2001-142409 discloses a technique in which driving of a light emission means is controlled in each of divided regions so that illuminating light is applied to at least a screen region which is necessary to be irradiated with the illuminating light in accordance with a video signal. According to the technique, it is possible not to apply the illuminating light to a screen region which is not necessary to be irradiated with the illuminating light, so the power consumption necessary for illumination may be reduced.

In addition, Japanese Unexamined Patent Application Publication No. 2006-330222 discloses a technique in which a liquid crystal display screen is divided into a plurality of display areas, and time degradation in brightness of each display area is corrected.

SUMMARY OF THE INVENTION

In contrast with categories such as a movie program or a sports program which are suitable to be watched with a large screen, TV programs include contents which are not necessarily watched with a large screen (for example, a news program, an educational program or the like). On the basis of the concept of Japanese Unexamined Patent Application Publication No. 2001-142409, a method in which in the case of contents of this kind, an image is downsized, and the downsized image is displayed on a part of a screen, and a backlight illuminating the other part is turned off is considered. Thereby, power consumption may be reduced.

However, in this method, the cumulative value of the backlight lighting time in a screen region used for displaying the downsized image is different from that in the other screen region. As a result, light emission characteristics of a backlight for a region where the lighting time is long decline over time, compared to a backlight for a region where the lighting time is short, so degradation in image quality such as a decline in the brightness of an image or color unevenness occurs accordingly.

In view of the foregoing, it is desirable to provide a liquid crystal display capable of reducing power consumption without time degradation in image quality by partial screen display through the use of a part of a large screen, and a display control method for the liquid crystal display.

According to an embodiment of the invention, there is provided a display including: a display panel; a backlight arranged corresponding to each of sub regions, and selectively illuminating the corresponding sub region, the sub regions being defined by dividing a display region of the display panel into a plurality of parts; a monitoring means for monitoring the light emission state of the backlight corresponding to each of the sub regions; and a display control means for determining a sub region on which an image is to be displayed, on the basis of the monitoring result of the monitoring means, to fit the image into the determined sub region, and controlling a backlight corresponding to the determined sub region to emit light.

According to an embodiment of the invention, there is provided a display control method for a display, the display including a display panel and a backlight arranged corresponding to each of sub regions and selectively illuminating the corresponding sub region, the sub region being defined by dividing a display region of the display panel into a plurality of parts, the method comprising the steps of: monitoring the light emission state of the backlight corresponding to each of the sub regions; and determining a sub region on which an image is to be displayed, on the basis of the monitoring result of the light emission state of the backlight, to fit the image into the determined sub region, and controlling a backlight corresponding to the determined sub region to emit light.

In the display and the display control method for a display according to the embodiment of the invention, a sub region which is supposed to be used for image display is determined on the basis of the monitoring result of the light emission state of the backlight for each of the sub regions, and an image is fitted into the determined sub region, and a backlight corresponding to the determined sub region is controlled so as to emit light. Therefore, depending on the light emission state of the backlight, switching between the sub regions on which an image is displayed is able to be performed.

In the display according to the embodiment of the invention, as a mode of monitoring the light emission state by the monitoring means, for example, a method of monitoring the cumulative light emission time of the backlight for each of the sub regions is considered. Time degradation in the backlight for each of the sub regions is able to be indirectly detected by the cumulative light emission time. Alternatively, a detecting means for detecting the brightness level of the backlight for each of the sub regions may be arranged so as to directly detect time degradation in the light emission state.

In the display and the display control method for a display according to the embodiment of the invention, the light emission state of the backlight arranged corresponding to each of the sub regions is monitored, and a sub region on which an image is to be displayed is determined on the basis of the monitoring result, and the image is fitted into the determined sub region, and a backlight corresponding to the determined sub region emits light, so when partial drive display on the display panel is performed, the light emission characteristics of the backlight is able to be controlled so as to be uniform on the full screen. As a result, the power consumption by partial screen display may be reduced without time degradation in image quality.

In particular, in the case where the cumulative light emission time of the backlight for each of the sub regions is monitored as a mode of monitoring the light emission state by the monitoring means, time degradation in the backlight for each of the sub regions is able to be indirectly detected through the use of the cumulative light emission time. In this case, it is not necessary to specifically arrange a brightness sensor, so an increase in the number of parts may be prevented.

Moreover, in the case where a display switching operation from the current sub region to another sub region is performed in synchronization with an operation to the input section, the sense of discomfort associated with switching may be reduced.

Further, in the case where a program determining means is arranged, and switches between the normal display mode and the downsized display mode depending on the category of a selected program on the basis of a program content determining result by the program determining means, mode switching may be automatically performed, so it is convenient for viewers.

Other and further objects, features and advantages of the invention will appear more fully from the following description.

DETAILED DESCRIPTION OF THE PREFERRED EMBODIMENTS

A best mode for carrying out the invention (hereinafter simply referred to embodiment) will be described in detail below referring to the accompanying drawings.

Figure 1:
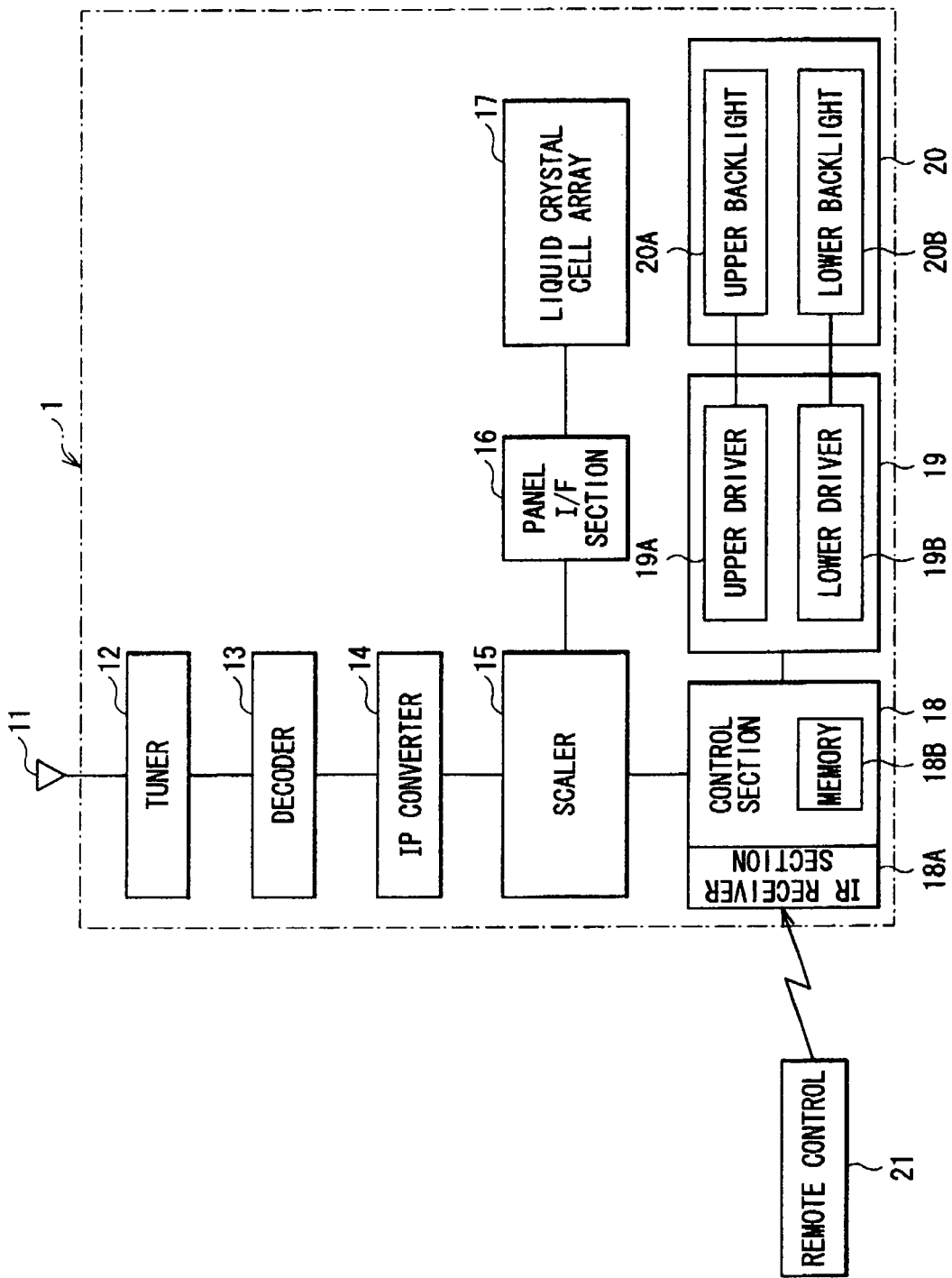
FIG. 1 is a block diagram showing the configuration of a liquid crystal display according to an embodiment of the invention.

FIG. 1 schematically shows the configuration of a liquid crystal display according to an embodiment of the invention. A liquid crystal display 1 is configured as a television receiver, and includes a tuner 12 for channel tuning which is connected to an image receiving antenna 11, a decoder 13 connected to the tuner 12, and an IP converter 14 connected to the decoder 13. The decoder 13 decodes an encoded signal selected by the tuner 12 to capture a video signal, an audio signal and associated data. The IP converter 14 converts the video signal which is an interlaced signal into a progressive signal (a non-interlaced signal).

The liquid crystal display 1 further includes a scaler 15 connected to the IP converter 14, a panel interface (I/F) section 16 connected to the scaler 15, and a liquid crystal cell array 17 connected to the panel I/F section 16. The scaler 15 is an image processor converting the video signal outputted from the IP converter 14 into a video signal in accordance with an actual display region (a sub region which will be described later or the whole region) in the liquid crystal cell array 17. The panel I/F section 16 converts the video signal outputted from the scaler 15 into a signal which meets specifications of the liquid crystal cell array 17 to supply the signal to the liquid crystal cell array 17.

The liquid crystal display 1 further includes a control section 18 connected to the scaler 15, a backlight driver (BL driver) 19 connected to the control section 18, and a backlight 20 connected to the BL driver 19. The control section 18 controls each block of the liquid crystal display 1, and corresponds to a specific example of a monitoring means, a display control means and a mode switching means in the invention. The control section 18 monitors, for example, the cumulative light emission time of a backlight for each sub region which will be described later of the liquid crystal cell array 17, or provides a scaling instruction which instructs the necessity or the kind of image scaling to the scaler 15, or a backlight control instruction to the BL driver 19. The control section 18 includes an IR receiver section 18A receiving various IR (infrared ray) instructions provided from a remote control unit (remote control) 21, and a memory 18B storing various control data. As will be described later, data stored in the memory 18B includes data showing the cumulative light emission time in each sub region of the backlight 20. The IR receiver section 18A corresponds to a specific example of an input section in the invention.

The BL driver 19 includes an upper driver 19A and a lower driver 19B, and the backlight 20 includes an upper backlight 20A and a lower backlight 20B. The upper backlight 20A is arranged corresponding to an upper half region of the liquid crystal cell array 17 on the back of the upper half region, and selectively illuminates the upper half region. On the other hand, the lower backlight 20B is arranged corresponding to a lower half region of the liquid crystal cell array 17 on the back of the lower half region, and selectively illuminates the lower half region. The upper driver 19A controls the light emission of the upper backlight 20A, and the lower driver 19B controls the light emission of the lower backlight 20B. The upper backlight 20A includes, for example, a plurality of CCFLs (cold cathode fluorescent tubes) which extend in a horizontal direction and are arranged in a vertical direction; however, instead of the CCFLs, the upper backlight 20A may include, for example, a large number of LEDs (light-emitting diodes) arranged in a matrix form, or an organic EL (electro-luminescence) device. The lower backlight 20B has the same configuration as that of the upper backlight 20A.

Figure 2:
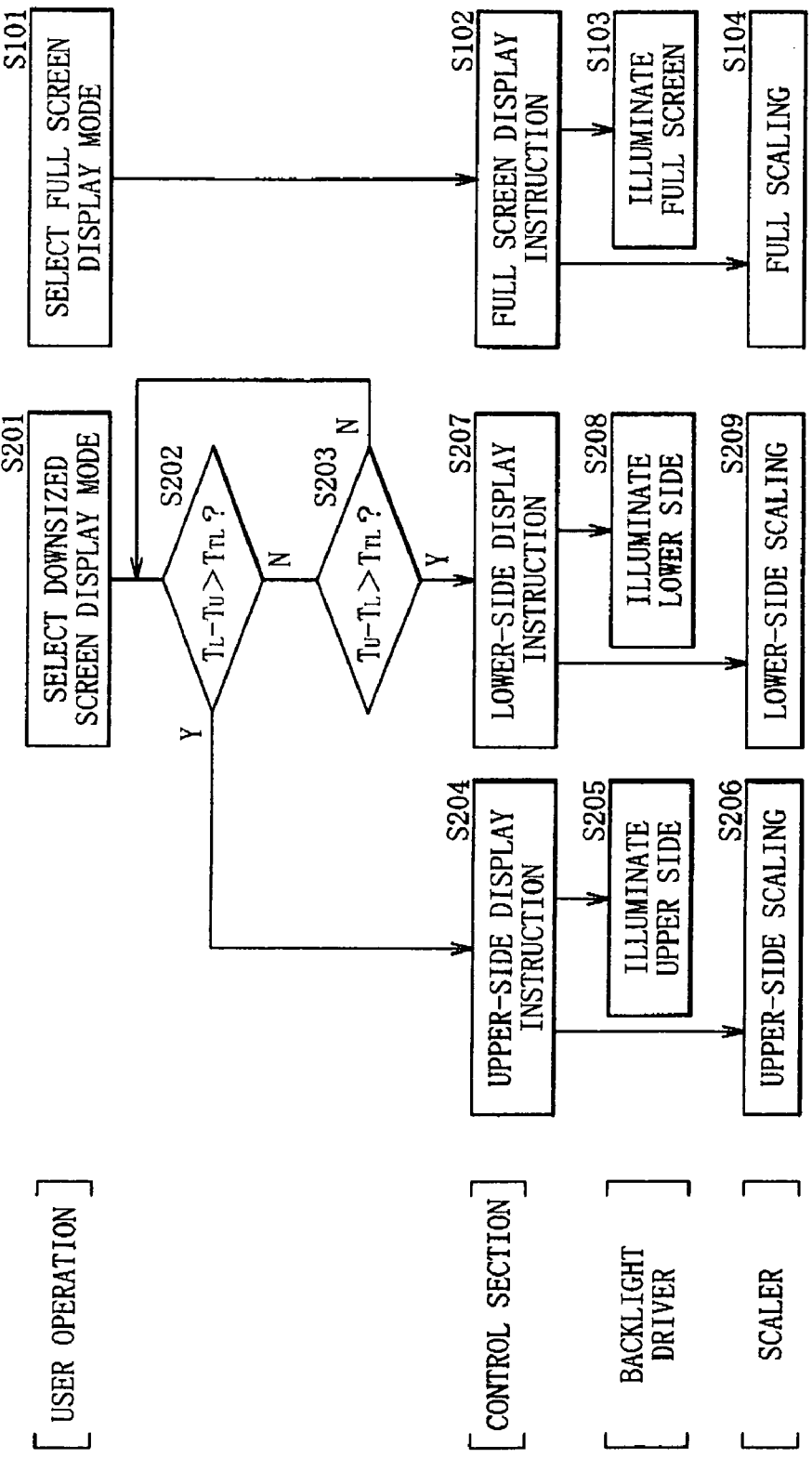
FIG. 2 is a flowchart for describing the operation of the liquid crystal display shown in FIG. 1.

Next, referring to FIG. 2, the operation of the liquid crystal display 1 with the above-described configuration will be described below.

The tuner 12 selects a signal of a channel from signals over airwaves received by the image receiving antenna 11 to input the signal into the decoder 13. The decoder 13 decodes an encoded signal selected by the tuner 12 to capture a video signal, an audio signal and associated data. The video signal outputted from the decoder 13 is converted from an interlaced signal to a progressive signal by the IP converter 14, and the video signal is inputted into the scaler 15.

The control section 18 monitors the light emission states of the upper backlight 20A and the lower backlight 20B to store the cumulative light emission time $T_U$ of the upper backlight 20A and the cumulative light emission time $T_L$ of the lower backlight 20B in the memory 18B. The cumulative light emission time $T_U$ is a cumulative value of the light emission time of the upper backlight 20A from when the liquid crystal display 1 is manufactured to the current time, and the cumulative light emission time $T_L$ is a cumulative value of the light emission time of the lower backlight 20B from when the liquid crystal display 1 is manufactured to the current time.

Figure 3A:
FIGS. 3A, 3B and 3C are illustrations showing examples of screen display in the liquid crystal display shown in FIG. 1.

When a viewer (not shown) operates the remote control 21 to provide a mode selection instruction for selecting a display mode, the instruction is captured by the control section 18 through the IR receiver section 18A. In the case where the mode selection instruction is to select a normal display mode (a full screen display mode) (step S101), the control section 18 provides a full screen display instruction (step S102). The upper driver 19A and the lower driver 19B of the BL driver 19 which receives the full screen display instruction turn the upper backlight 20A and the lower backlight 20B on, respectively to change into a full screen illumination state (step S103). At the same time, the scaler 15 fits the video signal into the full screen of the liquid crystal cell array 17 (step S104). Thereby, as shown in FIG. 3A, an image is displayed on the full screen of the liquid crystal panel. Therefore, for example, in the case where a program to be watched is a movie program, a sports program or the like, dynamic and realistic images is possible to be watched.

Figure 3B:
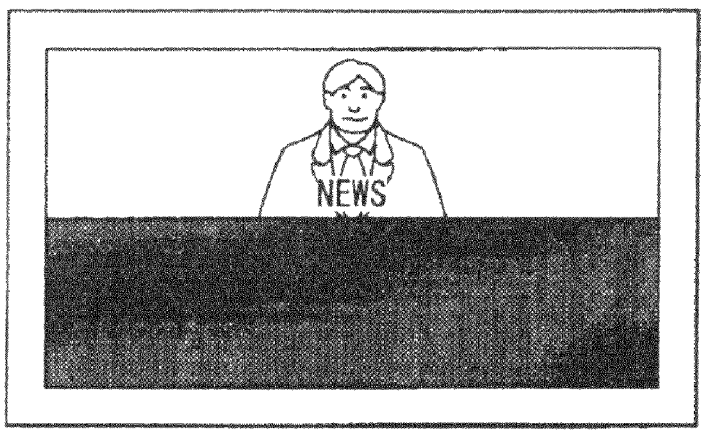

In the case where a program that a viewer is watching is a program which is not necessary to be displayed on a large screen such as a news program or an education program, and the mode selection instruction is to select a partial screen display mode (a downsized display mode) (step S201), the control section 18 determines a difference between the cumulative light emission time $T_U$ of the upper backlight 20A and the cumulative light emission time $T_L$ of the lower backlight 20B with reference to the memory 18B. As a result, if the cumulative light emission time $T_L$ is longer than the cumulative light emission time $T_U$, and the difference between them is larger than a predetermined threshold value $T_{TL}$ (step S202; Y), an upper-side display instruction is provided (step S204). The upper driver 19A of the BL driver 19 which receives the upper-side display instruction turns the upper backlight 20A on to illuminate the upper-side sub region of the liquid crystal cell array 17 (step S205), and the lower driver 19B turns the lower backlight 20B off. At the same time, the scaler 15 performs scaling (upper-side scaling) which downsizes an image so as to match the upper-side sub region, and fits the video signal into the upper-side sub region of the liquid crystal cell array 17 (step S206). Thereby, as shown in FIG. 3B, an image is displayed on the upper-side sub region of the liquid crystal panel. In this case, the lower backlight 20B is turned off, so the power consumption may be saved.

Figure 3C:
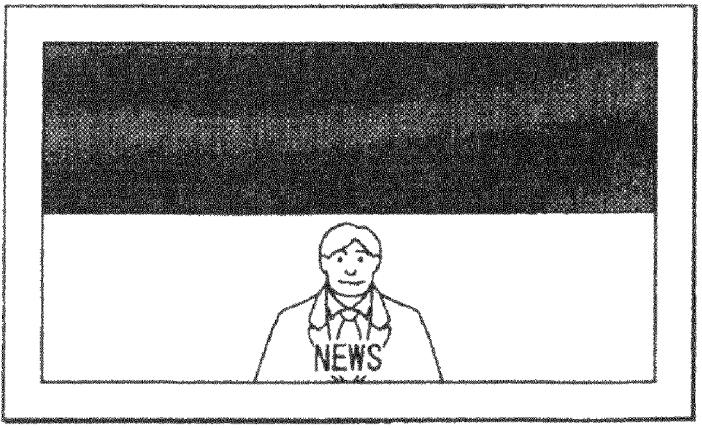

On the other hand, if the cumulative light emission time $T_U$ is longer than the cumulative light emission time $T_L$, and the difference between them is larger than the threshold value $T_{TL}$ (step S202; N, step S203; Y), a lower-side display instruction is provided (step S207). The lower driver 19B of the BL driver 19 which receives the lower-side display instruction turns the lower backlight 20B on to illuminate a lower-side sub region of the liquid crystal cell array 17 (step S208), and the upper driver 19A turns the upper backlight 20A off. At the same time, the scaler 15 performs scaling (lower-side scaling) which downsizes an image so as to match the lower-side sub region, and fits the video signal into the lower-side sub region of the liquid crystal cell array 17 (step S209). Thereby, as shown in FIG. 3C, an image is displayed on the lower-side sub region of the liquid crystal panel. In this case, the upper backlight 20A is turned off, so the power consumption may be saved.

When the difference between the cumulative light emission time $T_U$ and the cumulative light emission time $T_L$ does not exceed the threshold value $T_{TL}$ (step S202; N, step S203; N), display switching between the upper-side sub region and the lower-side sub region is not performed.

Thus, in the liquid crystal display 1, when a comparison between the cumulative light emission time $T_U$ of the upper backlight 20A and the cumulative light emission time $T_L$ of the lower backlight 20B is performed, and the difference between them is larger than the threshold value $T_{TL}$, switching is performed so that an image is displayed on a sub region with a shorter cumulative light emission time. As a result, the difference between the cumulative light emission times of the upper backlight 20A and the lower backlight 20B is controlled to be equal to or lower than the threshold value $T_{TL}$, so a difference in time degradation in light emission characteristics between the upper backlight 20A and the lower backlight 20B is maintained to be small. Therefore, it is difficult to cause uneven brightness or color unevenness due to brightness degradation or a chromaticity change between the upper-side sub region and the lower-side sub region of the liquid crystal panel, and degradation in image quality on the whole liquid crystal panel may be prevented.

Although the present invention is described referring to some embodiments, the invention is not limited to them, and may be variously modified. For example, in the embodiment, when a difference between the upper-side and lower-side cumulative light emission times exceeds the threshold value $T_{TL}$, image display is immediately switched to a sub region with a shorter cumulative light emission time; however, the invention is not limited to such control. For example, when the difference between the upper-side and the lower-side cumulative light emission times exceeds the threshold value $T_{TL}$, and after that, a viewer conducts an operation (for example, changes a channel or turns the power on after turning the power off), switching between sub regions used for display may be performed in synchronization with the operation. In this case, the sense of discomfort associated with switching between the sub regions may be reduced.

Figure 4:
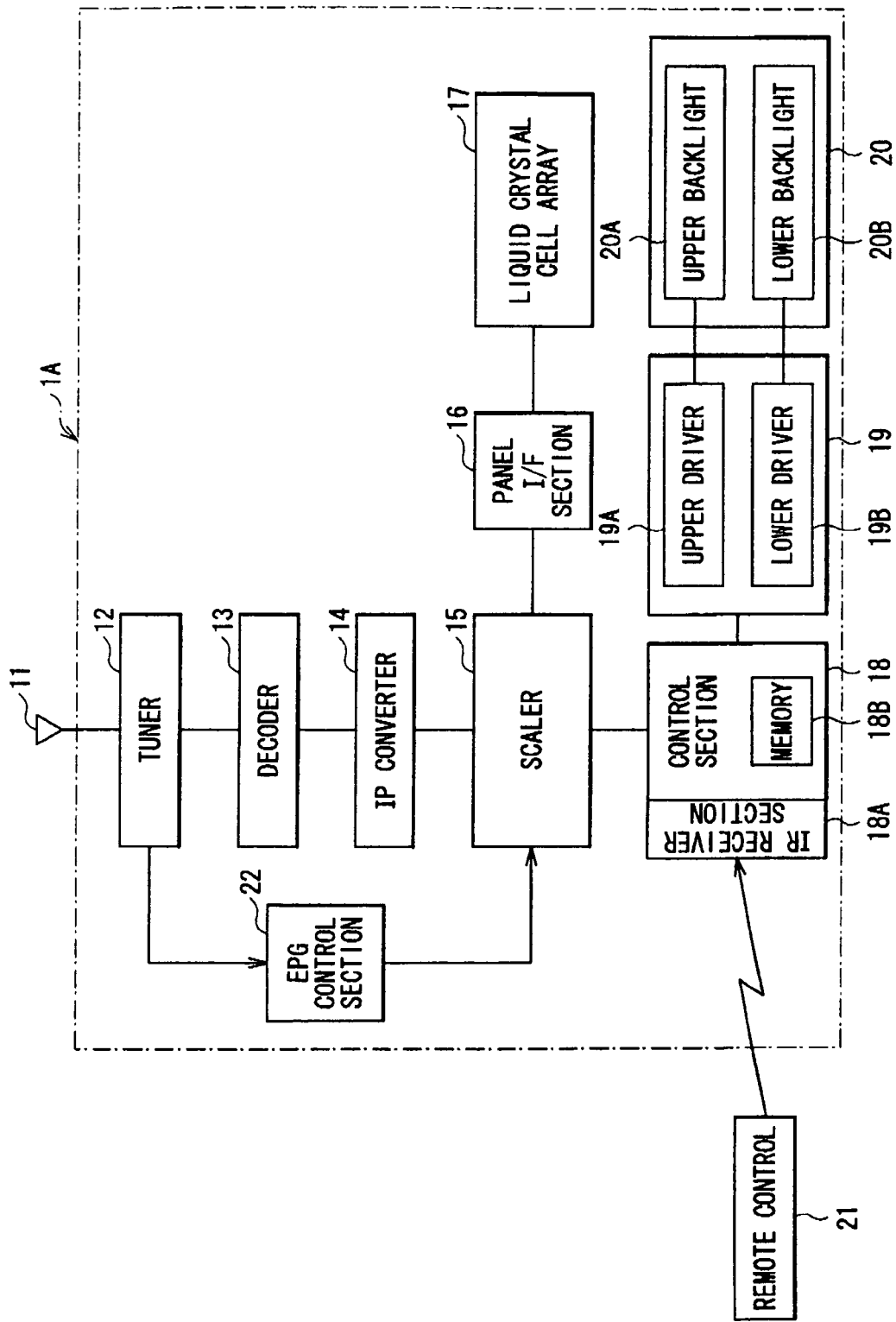
FIG. 4 is a block diagram showing a modification of the liquid crystal display shown in FIG. 1.

Moreover, in the embodiment, mode switching between the full screen display mode and the partial screen display mode is performed by a remote control operation by the viewer; however, the mode switching may be automatically performed depending on program category. In this case, for example, as shown in FIG. 4, as a program determining means, an EPG (Electric Program Guide) control section 22 is arranged to determine the content of a program selected by the tuner 12. As a result, the selected program falls in a category such as, for example, a movie program or a sports program, the EPG control section 22 provides a full screen display mode selection instruction to the scaler 15. On the other hand, when the selected program falls in a category such as, for example, a news program or an education program, the EPG control section 22 provides a partial screen display mode selection instruction to the scaler 15. Operations after this are the same as those in the above-described case (refer to FIG. 2). A liquid crystal display 1A shown in FIG. 4 has the same configuration as that of the liquid crystal display 1 shown in FIG. 1, except that the liquid crystal display 1A includes the EPG control section 22.

Figure 5A:
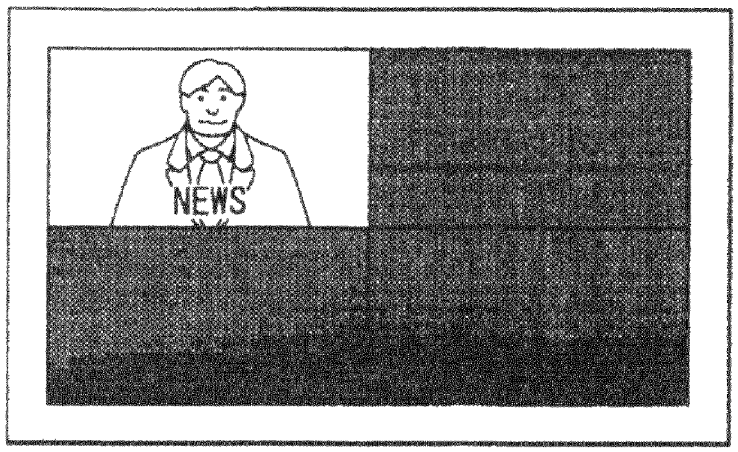
FIGS. 5A and 5B are illustrations showing other examples of screen display in the liquid crystal display shown in FIG. 4.
Figure 5B:
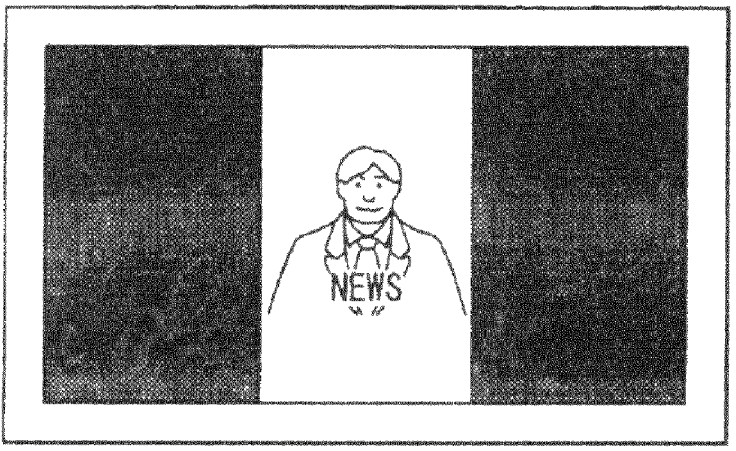

Further, in the embodiment, the case where the full screen of the liquid crystal panel is divided into two sub regions, that is, the upper-side sub region and the lower-side sub region is described; however, the invention is not limited to the case, and, for example, as shown in FIG. 5A, the full screen of the liquid crystal panel is divided into four sub regions, that is, an upper right sub region, an upper left sub region, a lower right sub region and a lower left sub region, and a backlight may be arranged corresponding to each sub region on the back of the sub region. Alternatively, for example, as shown in FIG. 5B, the full screen of the liquid crystal panel may be divided into three sub regions in a vertical direction, and a backlight may be arranged corresponding to each sub region on the back of the sub region. In these cases, when a difference of the cumulative light emission time between a backlight with the shortest cumulative light emission time and a backlight with the longest cumulative light emission time is monitored, and the difference exceeds the threshold value, the backlight with the shortest cumulative light emission time is turned on to display an image on a corresponding sub region. Thereby, a difference of the cumulative light emission time between a backlight with the shortest cumulative light emission time and a backlight with the longest cumulative light emission time out of four (three) backlights corresponding to four (three) sub regions is controlled so as to be equal to or lower than the threshold value. As a result, a difference in time degradation in light emission characteristics may be reduced, and degradation in the image quality on the whole liquid crystal panel may be prevented. Moreover, in this case, the cumulative light emission time of the backlight for each sub region may be reduced more than the case shown in FIGS. 3A to 3C, so the operating life of the whole backlight 20 is increased. In the case where the backlight is also divided in a vertical direction as in these cases, a plurality of LEDs are suitably arranged to form the backlight for each sub region. It is because in the case of an LED array, compared to the case where CCFLs are used, a boundary between the sub regions in the vertical direction is less noticeable.

In the embodiment, the degradation state of each backlight is indirectly detected by monitoring the cumulative light emission time of the backlight for each sub region; however, instead of this, a sensor detecting the light emission state (brightness or spectroscopic characteristics) of a backlight corresponding to each sub region is arranged to directly detect the degradation state of each backlight on the basis of a sensor output. In this case, the time degradation state of each backlight is able to be monitored with higher precision, so uneven image quality on the whole liquid crystal panel may be reduced.

In the embodiment, in the case where the partial screen display mode is selected, down-scaling is executed, thereby a downsized image obtained by the down-scaling is displayed on a sub region; however, the invention is not limited to the case, and, for example, a part of the whole image may be cut out without reducing its size to be displayed on a sub region.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:
   a display panel;
   a backlight arranged corresponding to each of sub regions, and selectively illuminating the corresponding sub region, the sub regions being defined by dividing a display region of the display panel into a plurality of parts;
   a monitoring means for monitoring light emission state of the backlight corresponding to each of the sub regions, wherein the light emission state includes a cumulative light emission time of the backlight for each sub region; and
   a display control means for:
      determining a difference of the cumulative light emission time between a backlight with the longest cumulative light emission time and a backlight with the shortest cumulative light emission time;
      comparing the difference to a predetermined threshold value;
      determining, when the difference is more than a predetermined threshold value, a sub region on which an image is to be displayed, to fit the image into the determined sub region; and
      controlling a backlight corresponding to the determined sub region to emit light.

2. The display according to claim 1, wherein the display control means produces a downsized image on the basis of an input image, and fits the downsized image into the determined sub region.

3. The display according to claim 1, further comprising:
   an input section receiving an instruction from a user,
   wherein in the case where the determined sub region is different from a current sub region currently used for display, the display control means performs a switching operation from the current sub region to the determined sub region in synchronization with an operation to the input section.

4. The display according to claim 1, further comprising:
   a mode switching means for selectively switching between a normal display mode in which an image is displayed on the whole display region of the display panel and a downsized display mode in which a downsized image is displayed on the predetermined sub region.

5. The display according to claim 4, further comprising:
   a receiving means for receiving a broadcast program; and
   a program determining means for determining the content of a program received and selected,
   wherein the mode switching means switches between the normal display mode and the downsized display mode depending on the category of the selected program on the basis of a determination result by the program determining means.

6. A display control method for a display, the display including a display panel and a backlight arranged corresponding to each of sub regions and selectively illuminating the corresponding sub region, the sub region being defined by dividing a display region of the display panel into a plurality of parts, the method comprising the steps of:
   monitoring light emission state of the backlight corresponding to each of the sub regions, wherein the light emission state includes a cumulative light emission time of the backlight for each sub region;
   determining a difference of the cumulative light emission time between a backlight with the longest cumulative light emission time and a backlight with the shortest cumulative light emission time;
   comparing the difference to a predetermined threshold value;
   determining, when the difference is more than a predetermined threshold value, a sub region on which an image is to be displayed, to fit the image into the determined sub region; and
   controlling a backlight corresponding to the determined sub region to emit light.

7. A liquid crystal display comprising:
   a liquid crystal display panel;
   a backlight arranged corresponding to each of sub regions, and selectively illuminating the corresponding sub region, the sub regions being defined by dividing a display region of the liquid crystal display panel into a plurality of parts;
   a monitoring means for monitoring light emission state of the backlight corresponding to each of the sub regions, wherein the light emission state includes a cumulative light emission time of the backlight for each sub region; and
   a display control means for:
      determining a difference of the cumulative light emission time between a backlight with the longest cumulative light emission time and a backlight with the
shortest cumulative light emission time;
comparing the difference to a predetermined threshold
value;
determining, when the difference is more than a predetermined threshold value, a sub region on which an
image is to be displayed, to fit the image into the
determined sub region; and
controlling a backlight corresponding to the determined
sub region to emit light.

8. The liquid crystal display according to claim 7, wherein the display control means produces a downsized image on the basis of an input image, and fits the downsized image into the determined sub region.

9. The liquid crystal display according to claim 7, further comprising:
an input section receiving an instruction from a user,
wherein in the case where the determined sub region is different from a current sub region currently used for display, the display control means performs a switching operation from the current sub region to the determined sub region in synchronization with an operation to the input section.

10. The liquid crystal display according to claim 7, further comprising:
a mode switching means for selectively switching between a normal display mode in which an image is displayed on the whole display region of the liquid crystal display panel and a downsized display mode in which a downsized image is displayed on the predetermined sub region.

11. The liquid crystal display according to claim 10, further comprising:
a receiving means for receiving a broadcast program; and
a program determining means for determining the content of a program received and selected,
wherein the mode switching means switches between the normal display mode and the downsized display mode depending on the category of the selected program on the basis of a determination result by the program determining means.

12. A display control method for a liquid crystal display, the liquid crystal display including a liquid crystal display panel and a backlight arranged corresponding to each of sub regions and selectively illuminating the corresponding sub region, the sub regions being defined by dividing a display region of the liquid crystal display panel into a plurality of parts, the method comprising the steps of:
monitoring light emission state of the backlight corresponding to each of the sub regions, wherein the light emission state includes a cumulative light emission time of the backlight for each sub region;
determining a difference of the cumulative light emission time between a backlight with the longest cumulative light emission time and a backlight with the shortest cumulative light emission time;
comparing the difference to a predetermined threshold value;
determining, when the difference is more than a predetermined threshold value, a sub region on which an image is to be displayed, to fit the image into the determined sub region; and
controlling a backlight corresponding to the determined sub region to emit light.

13. A display comprising:
a display panel;
a backlight arranged corresponding to each of sub regions, and selectively illuminating the corresponding sub region, the sub regions being defined by dividing a display region of the display panel into a plurality of parts;
a monitoring section monitoring light emission state of the backlight corresponding to each of the sub regions wherein the light emission state includes a cumulative light emission time of the backlight for each sub region; and
a display control section for:
determining a difference of the cumulative light emission time between a backlight with the longest cumulative light emission time and a backlight with the shortest cumulative light emission time;
comparing the difference to a predetermined threshold value;
determining when the difference is more than a predetermined threshold value, a sub region on which an image is to be displayed, to fit the image into the determined sub region; and
controlling a backlight corresponding to the determined sub region to emit light.

14. A liquid crystal display comprising:
a liquid crystal display panel;
a backlight arranged corresponding to each of sub regions, and selectively illuminating the corresponding sub region, the sub regions being defined by dividing a display region of the liquid crystal display panel into a plurality of parts;
a monitoring section monitoring light emission state of the backlight corresponding to each of the sub regions, wherein the light emission state includes a cumulative light emission time of the backlight for each sub region; and
a display control section for:
determining a difference of the cumulative light emission time between a backlight with the longest cumulative light emission time and a backlight with the shortest cumulative light emission time;
comparing the difference to a predetermined threshold value;
determining, when the difference is more than a predetermined threshold value, a sub region on which an image is to be displayed, to fit the image into the determined sub region; and
controlling a backlight corresponding to the determined sub region to emit light.

15. The display according to claim 1, wherein the determined sub region to emit light is a sub region corresponding to the backlight with the shortest cumulative light emission time.

16. The display control method according to claim 6, wherein the determined sub region to emit light is a sub region corresponding to the backlight with the shortest cumulative light emission time.

17. The liquid crystal display according to claim 7, wherein the determined sub region to emit light is a sub region corresponding to the backlight with the shortest cumulative light emission time.

18. The display control method according to claim 12, wherein the determined sub region to emit light is a sub region corresponding to the backlight with the shortest cumulative light emission time.

19. The liquid crystal display according to claim 14, wherein the determined sub region to emit light is a sub region corresponding to the backlight with the shortest cumulative light emission time.

20. The display according to claim 1, wherein the display control means displays part of an input image in the determined sub region without downsizing the input image.

21. The display control method according to claim 6, wherein the display control means displays part of an input image in the determined sub region without downsizing the input image.

22. The display control method according to claim 12, wherein the display control means displays part of an input image in the determined sub region without downsizing the input image.

23. The liquid crystal display according to claim 14, wherein the display control means displays part of an input image in the determined sub region without downsizing the input image.

* * * * *